(12) United States Patent
Novak

(10) Patent No.: US 9,890,850 B2
(45) Date of Patent: Feb. 13, 2018

(54) TRANSMISSION DEVICE WITH A HYDRAULIC SYSTEM INCLUDING A PUMP DEVICE

(71) Applicant: ZF Friedrichshafen AG, Friedrichshafen (DE)

(72) Inventor: Rainer Novak, Bregenz (AT)

(73) Assignee: ZF Friedrichshafen AG, Friedrichshafen (DE)

( * ) Notice: Subject to any disclaimer, the term of this patent is extended or adjusted under 35 U.S.C. 154(b) by 525 days.

(21) Appl. No.: 14/538,191

(22) Filed: Nov. 11, 2014

(65) Prior Publication Data

US 2015/0135876 A1 May 21, 2015

(30) Foreign Application Priority Data

Nov. 12, 2013 (DE) ......................... 10 2013 222 984

(51) Int. Cl.
*F16H 61/00* (2006.01)

(52) U.S. Cl.
CPC . *F16H 61/0031* (2013.01); *F16H 2061/0037* (2013.01); *F16H 2061/0046* (2013.01); *Y10T 74/20024* (2015.01)

(58) Field of Classification Search
CPC ..................... F16H 2061/0037; F16H 61/0031
See application file for complete search history.

(56) References Cited

U.S. PATENT DOCUMENTS 4,531,893 A * 7/1985 Okoh .................... F04C 2/3442
417/220

FOREIGN PATENT DOCUMENTS

| DE | 103 18 152 A1 | 11/2004 |
| DE | 10 2005 042 685 A1 | 2/2007 |
| DE | 10 2011 077 552 A1 | 12/2012 |
| EP | 2 336 590 A2 | 6/2011 |

OTHER PUBLICATIONS

English translation of DE10318152—listed on Applicant's IDS.*
German Patent Office Search Report, dated Sep. 15, 2014.

* cited by examiner

*Primary Examiner* — William Kelleher
*Assistant Examiner* — Gregory Prather
(74) *Attorney, Agent, or Firm* — Dority & Manning, P.A.

(57) ABSTRACT

A transmission device with a hydraulic system includes a pump device, a primary pressure circuit, and at least one additional pressure circuit supplied with hydraulic fluid by the pump device. The pump device is coupled to and driven by a transmission input shaft. A first pump unit of the pump device is connected to and driven by the transmission input shaft. A second pump unit of the pump device is connected to and driven by a transmission output shaft. A pressure side of the first pump unit is connected to the primary pressure circuit, and is connectable to the additional pressure circuit, while a pressure side of the second pump unit is connected to the additional pressure circuit, and is able to be coupled with the primary pressure circuit.

10 Claims, 2 Drawing Sheets

TRANSMISSION DEVICE WITH A HYDRAULIC SYSTEM INCLUDING A PUMP DEVICE

FIELD OF THE INVENTION

The invention relates to a transmission device with a hydraulic system including a pump device that is coupled with a transmission input shaft.

BACKGROUND

Transmission devices known from practice, such as automatic transmission devices, typically feature a hydraulic system that is supplied with hydraulic fluid by a pump device. As is generally known, pump devices include, among other things, so-called fixed-displacement pumps, the flow rate of which depends on the drive speed, or variable-displacement pump devices, the flow volume of which is adjustable. Pump devices are usually positioned in the area of transmission input shafts and are driven by drive units of vehicle drive trains of vehicles designed with automatic transmissions, whereas requirements that vary greatly are generally to be covered through such pump devices.

Many hydraulic actuators of such hydraulic systems, such as clutches or shift rods, are of a nature such that are supplied with a defined volume of oil or a defined level of pressure for a desired operation. Particularly for transmission devices designed with wet dual-clutch systems, through the pump devices, hydraulic resisters, such as cooling oil and lubricant oil connections for the dual-clutch system, for the wheel set of the transmission device and for bearing devices, are supplied with hydraulic fluid.

The last-mentioned hydraulic resistors or actuators often operate at pressure levels that are much lower than other hydraulic consumers of the transmission devices, such as dual clutches or shifting actuators. The maximum pressure level to be available is a determining factor for the hydraulic power draw of a pump device. If all consumers are supplied through a single pump, for the supply of cooling lines and lubricant oil lines, clearly more power must be made available by internal combustion engines. It is favorable for energy purposes if each of such consumers, which preferably is able to be operated at a similarly high pressure level, is supplied with hydraulic fluid by a shared pump unit, and the transmission device is designed with several pump units. However, purely from an energy perspective, this increases the installation space and the production costs of a transmission device to an undesired extent.

Since, viewed in terms of energy, a drive unit of a vehicle drive train designed as an internal combustion engine represents the largest source of loss of a vehicle, the greatest energy savings are achievable by switching off the internal combustion engine. With newer generations of vehicles that are designed with start-stop systems, for example during a vehicle standstill or during a so-called "coasting mode," internal combustion engines are switched off.

However, disadvantageously, the pump devices for the transmission devices described above are not driven in the switched-off operating state of the drive units, which is why hydraulic sub-systems of a hydraulically actuated automatic transmission then idle, at least in part. If, upon a subsequent restart of the internal combustion engine in the area of a transmission device, a requested operating state is to be presented, but is only possible through a corresponding functioning hydraulic system, i.e., through a fully filled hydraulic system, the transmission device is only available again with the desired functionality after the expiration of an undesired downtime that impairs the spontaneity of a vehicle. Such downtimes are not accepted by drivers, and therefore must be avoided.

Furthermore, at higher vehicle speeds, a lack of hydraulic supply of the wheel set of a transmission device leads to an insufficient lubrication or injection lubrication, which, during unfavorable operating conditions, causes loads that are not negligible in the area of the wheel set.

With transmission devices designed as dual-clutch systems, during a coasting mode, there is the option of having a gear engaged in the transmission itself, in order to, for example, realize the reconnection of the internal combustion engine during or after the restart of the internal combustion engine. However, in the switched-off operating state of a drive unit of a vehicle drive train, during which the pump device does not advance any hydraulic fluid, the actuation of the actuators of the hydraulic system of the transmission device, and thus gear changes, are no longer possible, by which time periods, through which a coasting mode can be realized, are limited to an undesired extent. This limitation is particularly pronounced when coasting or sliding, starting from higher vehicle speeds.

In order to supply a hydraulic system with hydraulic fluid, for example, during a coasting mode or during a switched-off operating state of the drive unit of a vehicle drive train to a desired extent, as is generally known, transmission devices feature an additional electrically drivable pump for hydraulic supply. However, such additional electrically drivable pumps are characterized by an unfavorable relationship between the hydraulic power that can be made available and the necessary need for installation space. In addition, electrically drivable pumps are operable only with efficiencies that are unfavorable in terms of energy.

EP 2 336 590 A2 discloses a pump unit for a dual-clutch transmission of a motor vehicle. The pump unit comprises a pump that generates, in a first operating state, a cooling flow for clutches, in a second operating state, a power flow for control elements of the dual-clutch transmission, and in a third operating state, both the cooling flow and the power flow. The pump is designed as a screw-spindle pump, and is driven by the engine of a vehicle drive train.

However, it is disadvantageous that, during a coasting mode of a vehicle designed with the pump unit, during which the drive unit is switched off, the hydraulic system of the dual-clutch transmission is not able to be supplied with hydraulic fluid to a desired extent.

Furthermore, DE 10 2005 042 685 A1 discloses a transmission with two transmission oil pumps, with which a first transmission pump is driven on the side of the drive unit, and makes available a pressure level depending on the drive speed and a volume flow of hydraulic fluid depending on the drive speed. This volume flow of hydraulic fluid serves as the drive for a second transmission pump designed as a suction jet pump, through which a volume flow of hydraulic fluid is increased for a secondary pressure circuit.

However, with a stationary drive unit, neither the secondary pressure circuit nor a primary pressure circuit of the transmission is able to be supplied with hydraulic fluid through the two transmission oil pumps.

SUMMARY OF THE INVENTION

As such, this invention is subject to a task of providing a structurally simple transmission device that is favorable for installation space, by means of which a hydraulic system is able to be supplied with hydraulic fluid to a desired extent across an operating area of the vehicle drive train that is as large as possible. Additional objects and advantages of the invention will be set forth in part in the following description, or may be obvious from the description, or may be learned through practice of the invention.

In accordance with the invention, the tasks are solved with a transmission device as described and claimed herein.

For the transmission device in accordance with the invention, with a hydraulic system comprising a pump device, a primary pressure circuit and at least one additional pressure circuit are able to be supplied with hydraulic fluid by the pump device. The pump device is coupled with a transmission input shaft and is drivable by the transmission input shaft.

In accordance with the invention, a first pump unit of the pump device is connected to and drivable by the transmission input shaft, while a second pump unit of the pump device is connected to and drivable by a transmission output shaft. A pressure side of the first pump unit is connected to the primary pressure circuit, and is connectable to the additional pressure circuit. A pressure side of the second pump unit is connected to the additional pressure circuit, and is able to be coupled with the primary pressure circuit.

Generally, the present invention is subject to the knowledge that, from the standpoint of energy, each consumer of a transmission is generally to be provided with its own pump. However, for cost reasons, this is not practicable, which is why, with the present transmission device, the supply of various consumers is pooled in a suitable manner, and the hydraulic supply of such consumers takes place through two pump units. Thereby, in the installed operating state of the present transmission device, the first pump unit is driven by the transmission input shaft, and thus by the associated drive unit of a vehicle drive train, while the second pump unit is operated by the transmission output shaft and thus the rotational speed of an output of a vehicle drive train.

During so-called "normal operation," i.e., with a switched-on drive unit and a correspondingly high output speed, the primary circuit of the transmission device is supplied with pressure or hydraulic fluid by the first pump unit driven on the side of the drive unit. Through the primary pressure circuit, clutches, shift rod mechanisms and a cooling system of a dual-clutch system (for example) are supplied with hydraulic fluid. Since, during normal driving operation, the second pump unit is driven on the output side, the additional pressure circuit, through which a wheel set lubrication and a lubrication of an all-wheel drive coupling can take place, is supplied with hydraulic fluid by the second pump unit.

Through the system described above, for example, during a so-called "race start" starting from a vehicle standstill of a vehicle designed with the present transmission device, during which the drive pedal and brake pedal are actuated by the driver at the same time, and the rotational speed of the drive unit is led in the direction of the maximum rotational speed with a simultaneous vehicle standstill, the option exists of providing a dual-clutch system with correspondingly high volume flow of cooling oil, in order to dissipate heat that arises based on the high differential rotational speed and avoid damages in the area of the dual-clutch system. During the race start process, based on an output speed equal to zero, the second pump unit during a vehicle standstill does not advance any hydraulic fluid, and the additional pressure circuit is not supplied with hydraulic fluid by the second pump unit. Nevertheless, in order to make hydraulic fluid available for the additional pressure circuit, during the race start process, the additional pressure circuit is able to be supplied with hydraulic fluid by the first pump unit.

In contrast to this, during a coasting mode, during which the drive unit is switched off in order to save fuel, and the power flow between the output and the transmission input shaft is interrupted, preferably in the transmission device, the primary pressure circuit is not driven by the transmission input shaft, and the primary pressure circuit of the first pump unit is not supplied with hydraulic fluid. Nevertheless, in order to supply the primary pressure circuit with hydraulic fluid during the coasting mode, the primary pressure circuit is supplied with hydraulic fluid with the second pump unit, which is driven by the output with an output speed greater than zero, or is able to be supplied with hydraulic fluid by this.

With a structurally simple and cost-effective embodiment of the transmission device in accordance with the invention, the pressure side of the second pump unit is, upon the presence of a positive pressure gradient between the additional pressure circuit and the primary pressure circuit, connected to the primary pressure circuit through a non-return valve and, with a negative pressure gradient, separated from the primary pressure circuit through a non-return valve. The positive pressure gradient between the additional pressure circuit and the primary pressure circuit exists, for example, during a coasting mode of a vehicle designed with the present transmission device.

With one embodiment of the transmission device that is able to be simply operated, the pressure side of the first pump unit is connectable to the additional pressure circuit through a valve unit between the primary pressure circuit and the additional pressure circuit.

If the pressure side of the first pump unit is able to be coupled to an additional pressure circuit through the valve unit, through which, for example, the cooling of a dual-clutch system of the transmission device takes place, whereas the pressure side of the first pump unit, in a coupled state with the additional pressure circuit, upon the presence of a positive pressure gradient between the primary pressure circuit and the additional pressure circuit through an additional non-return valve is connected to the additional pressure circuit, it is ensured in a simple manner that the additional pressure circuit, with a sufficiently high pressure level of the primary pressure circuit and upon a simultaneous inadequate supply of the additional pressure circuit originating from the second pump unit, is able to be supplied with hydraulic fluid by the first pump unit, at least approximately to a desired extent.

If the additional non-return valve is provided in a line that branches off downstream of a throttle device from a line leading in the direction of the additional pressure circuit, it is ensured that the additional pressure circuit, upon an insufficient supply of the additional pressure circuit originating from the second pump unit, is supplied with the desired volume flow of hydraulic fluid or the desired hydraulic pressure through the additional non-return valve, since a defined pressure drop between the valve unit and the additional non-return valve is adjusted by the throttle device.

With an additional embodiment of the transmission device in accordance with the invention that is structurally simple and able to be actuated with little effort, a throttle device is provided in a line between the additional non-return valve and the pressure side of the second pump unit. Thus, it is in turn ensured that, upon a supply of the additional pressure circuit with hydraulic fluid originating from the primary pressure circuit, through the additional non-return valve, a pressure drop in the direction of the pressure side of the second pump unit is defined, and the additional pressure circuit is supplied with hydraulic fluid to a desired extent.

If the additional pressure circuit is connected to the pressure side of the second pump unit by an additional line branching off from the line between the additional non-return valve and the pressure side of the second pump unit in relation to the second pump unit downstream of the throttle device, a defined pressure drop is in turn defined in the direction of the additional pressure circuit.

Power losses caused in the area of the first pump unit are then reduced in a structurally simple manner if a conveyed volume of the first pump unit is adjustable, whereas, preferably, the first pump unit can be designed as an adjustable vane pump.

With an additional form of the transmission device in accordance with the invention characterized by a small need for installation space and by a structurally simple assembly, the second pump unit is designed as a fixed-displacement pump, preferably as a throttled fixed-displacement pump.

If the pump units feature a common suction line, hydraulic fluid dispensed from an oil sump in the area of a single suction filter is cleanable to a desired extent.

If the suction lines of the pump units are designed to be separate from each other, the pump units are able to be arranged with a degree of freedom higher than that for the design of the pump device with a common suction line for the two pump units in the transmission device.

Both the characteristics specified in the claims and the characteristics specified in the subsequent embodiments of the transmission device in accordance with the invention are, by themselves alone or in any combination with one another, suitable for providing additional forms for the object in accordance with the invention. In terms of the additional forms of the object in accordance with the invention, the particular combinations of characteristics do not represent a limitation; rather, they are essentially solely of an exemplary nature.

BRIEF DESCRIPTION OF THE DRAWINGS

Additional advantages and advantageous embodiments of the transmission device in accordance with the invention arise from the embodiment described below, with reference to the drawing in terms of principle, whereas, for the sake of clarity, in the description of the various embodiments, the same reference signs are used for structurally and functionally equivalent components.

The following is shown.

DETAILED DESCRIPTION

Figure 1:
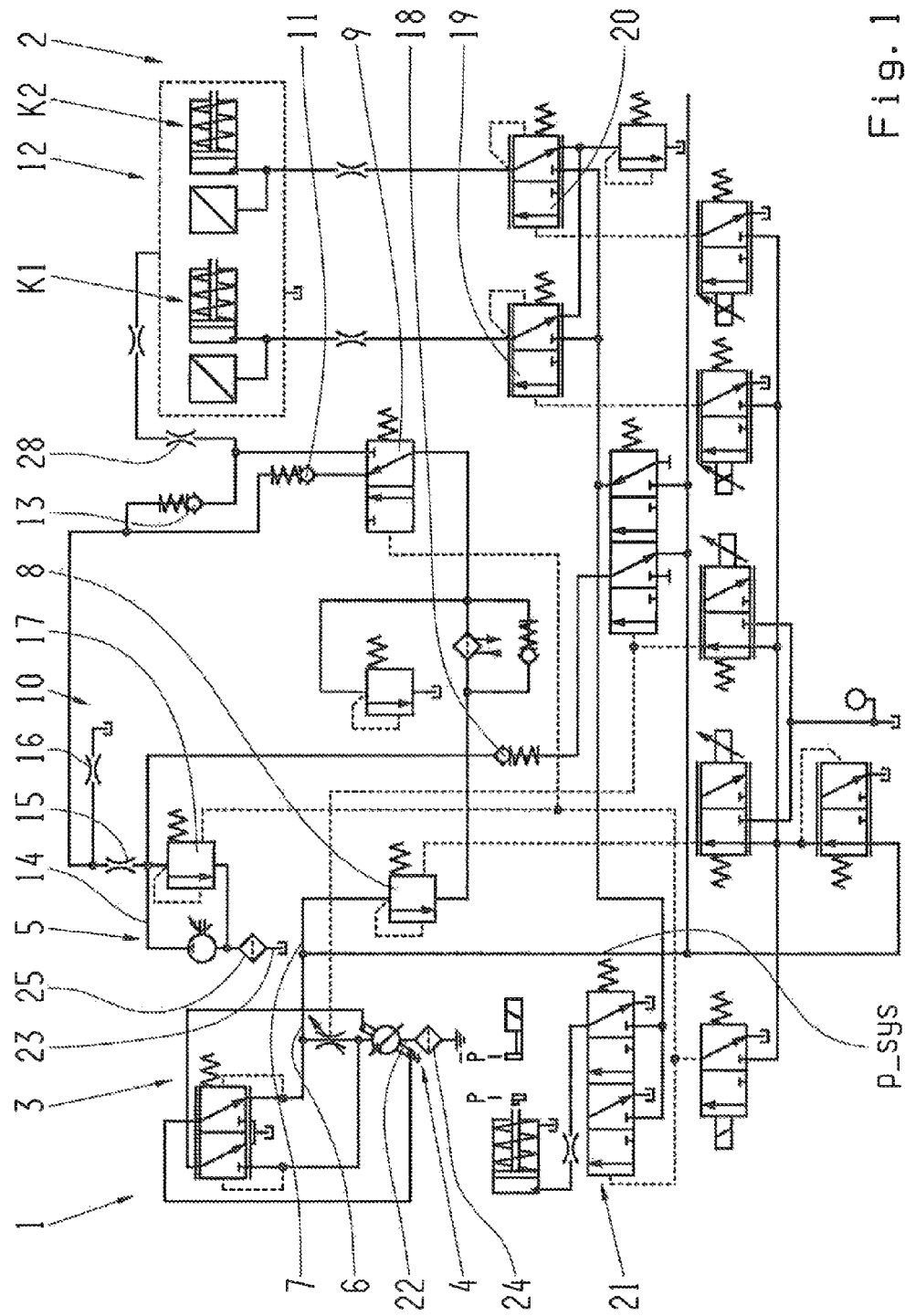
FIG. 1 a part of a hydraulic system of a first embodiment of the transmission device in accordance with the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a part of a hydraulic system 1 of a transmission device 2 or a double-clutch transmission. The hydraulic system 1 includes a pump device 3 with two pump units 4, 5, whereas the first pump unit 4 is designed as an adjustable vane pump, and the second pump unit 5 is designed as a fixed-displacement pump.

In the present case, the first pump unit 4 represents the main transmission pump, which is coupled in a known manner to the transmission input shaft, which is not presented in detail in the drawing, and is thus drivable by a drive unit, preferably an internal combustion engine, connectable to the transmission input shaft of the transmission device 2. In contrast to this, the second pump unit 5 is coupled to the transmission output shaft, which in turn is connectable in a known manner to an output of a vehicle drive train designed with the transmission device 2 and is drivable with a drive speed equivalent to the output speed. A pressure side 6 of the first pump unit 4 is connected to a primary pressure circuit 7, in which there is a system pressure p_sys, which is adjustable by a pilot-controllable system pressure valve 8. Downstream of the system pressure valve 8, a pilot-controllable valve unit 9 is also provided; this represents a cooling valve. In the shifting position of the valve unit 9 shown in FIG. 1, the primary pressure circuit 7 is connected to an additional pressure circuit 10, if there is a positive pressure gradient between the primary pressure circuit 7 and the additional pressure circuit 10, which leads to an opening of a non-return valve device 11.

In the second shifting position of the valve unit 9, the primary pressure circuit is connected to an additional pressure circuit 12, through which the two clutches K1 and K2 of the dual-clutch system of the transmission device 2 are supplied with the necessary quantity of cooling oil, depending on the operating state. In the second shifting position of the valve unit 9, the pressure existing downstream of the system pressure valve 8 is also applied at a non-return valve 13, which is open above a positive difference between the primary pressure circuit 7 and the additional pressure circuit 10, by which the additional pressure circuit 10 is also supplied with hydraulic fluid in the second shifting position of the valve unit 9 at a corresponding pressure gradient between the primary pressure circuit 9 and the additional pressure circuit 10 originating from the pressure side 6 of the first pump unit 3. The non-return valve 13 is provided in a line that branches off of a line, upstream of a throttle device 28, leading in the direction of the additional pressure circuit 12.

A pressure side 14 of the second pump unit 5 is connected to the additional pressure circuit 10 through a first throttle device 15 and a second throttle device 16. The pressure of the pressure side 14 of the second pump unit 5 is variable, depending on a pilot-controllable pressure limiting valve 17. Furthermore, the pressure of the pressure side 14 of the second pump unit 5 is applied at an additional non-return valve 18, which is open above a defined positive pressure difference between the pressure side 14 of the second pump unit 5 or the additional pressure circuit 10 and the pressure side 6 of the first pump unit 4, and closed below this pressure difference. Thus, the primary pressure circuit 7 originating from the second pump unit 5, upon the presence of the necessary positive pressure difference between the pressure side 14 of the second pump unit 5 and the pressure side 6 of the first pump unit 4 originating from the second pump unit 5, is able to be supplied with hydraulic fluid.

A demand-actuated hydraulic supply of assigned actuators takes place through the first pump unit 4. Thus, for example, coupling valves 19 and 20 assigned to the two clutches K1 and K2 along with a parking brake system 21 originating from the primary circuit 7 of the first pump unit 3 are supplied with hydraulic fluid. The second pump unit 5 is assigned to the additional pressure circuit 10, which represents a low-pressure circuit, and provides a lubricating spin to the wheel set cooling system and also an all-wheel coupling, which represents a so-called "hang-on coupling."

During normal operating conditions, during which a drive unit, in this case designed as an internal combustion engine, of a vehicle drive train designed with the transmission device 2 is switched on, and the rotational speed of the transmission input shaft is greater than zero and at the same time the driving speed or the drive speed is likewise greater than zero, the wheel set of the transmission device 2 and the all-wheel coupling are supplied with hydraulic fluid through the additional pressure circuit 10, at least originating from the second pump unit 5. Since the load of the wheel set of the transmission device 2 usually increases with an increasing vehicle speed, a demand-actuated oil cooling takes place through the second pump unit 5, its pump drive speed or its flow rate, in proportion to the vehicle speed, automatically at certain operating points.

With a stationary vehicle or slow vehicle speeds and at the same time high turning moment loads in the area of the wheel set, for example during a race start situation, during which the rotational speed of the drive unit is nearly at a maximum and the driver operates the service brake at the same time, on the basis of the configuration of the hydraulic system 1 described above, the wheel set of the transmission device 2 is also able to be supplied with hydraulic fluid through the non-return valve 11 by the first pump unit 4 or the vane pump. In principle, this additional supply option of the additional pressure circuit 10 originating from the first pump unit 4 through the non-return valve device 11 or the non-return valve 13 enables a smaller dimensioning of the second pump unit 5.

If, at higher speeds, for example, upon a coasting mode, the drive unit of the vehicle drive train is switched off and the first pump unit 4 is not advancing any hydraulic fluid, the option exists of supplying the primary pressure circuit 7 with hydraulic fluid through the additional non-return valve 18 originating from the second pump unit 5 operated with the output speed or the rotational speed equivalent to this. If the pressure at the pressure side 14 of the second pump unit 5 is raised by the pressure limiting valve 17, the option exists of, at certain operating points of the transmission device 2 or the vehicle drive train designed for it, maintaining a limited functionality of the transmission device 2, for example gear tracking, clutch cooling or the like, through the second pump unit 5.

During such operating state curves of the vehicle drive train, the second pump 5 obtains its drive energy from the vehicle mass and, based on the direct energy conversion, in contrast to an electrically operated auxiliary pump, does not cause an undesired load of an electrical supply system or the like, and is also operable with a more favorable efficiency and is characterized by a lower ratio of installation space to performance requirements. Additional electrical consumers are then able to be supplied with electrical energy over a period of time longer than for vehicles in the case that they are designed with additional electrically drivable pumps. In particular during a coasting mode, with a transmission ratio inserted in the area of the transmission device 2, for clutches of the transmission device 2 simultaneously supplied with operating pressure, under certain circumstances, a charging of an electrical storage unit is even possible if a regeneratively operable electric engine is provided.

As long as the driving speed of a vehicle designed with the transmission device 2 is greater than zero, with a switched-off drive unit, an idling of the primary pressure circuit 7 is even prevented, since the primary pressure circuit 7 originating from the second pump unit 5, above the positive pressure gradient necessary for the opening of the non-return valve 18, between the additional pressure circuit 10 or the pressure side 14 of the second pump unit 5 and the primary pressure circuit 7, is permanently supplied with the hydraulic fluid by the second pump unit 5. In turn, it follows from this that, upon a restart of the drive unit, the desired operating conditions, such as the engagement of a desired gear and the simultaneous pressing of the clutches of the transmission device 2, can be produced without great delays.

For example, during the carrying out of gearshifts in the transmission device 2, the cooling of the two clutches K1 and K2 originating from the primary pressure circuit 7 in the area of the valve unit 9 is switched off, in order to be able to carry out the requested gearshift within the desired short operating times, without any delay. In such an operating state, the wheel set is nevertheless able to be supplied with hydraulic fluid through the non-return valve device 11.

Since the two pump units 4 and 5 of the embodiment of the transmission device 2 shown in FIG. 1 are designed with separate suction lines 22, 23 and in each case with their own filter devices 24, or 25, the design of the hydraulic system 1 of the transmission device 2 offers the option of positioning the two pump units 4 and 5 at different locations of the transmission device 2.

Figure 2:
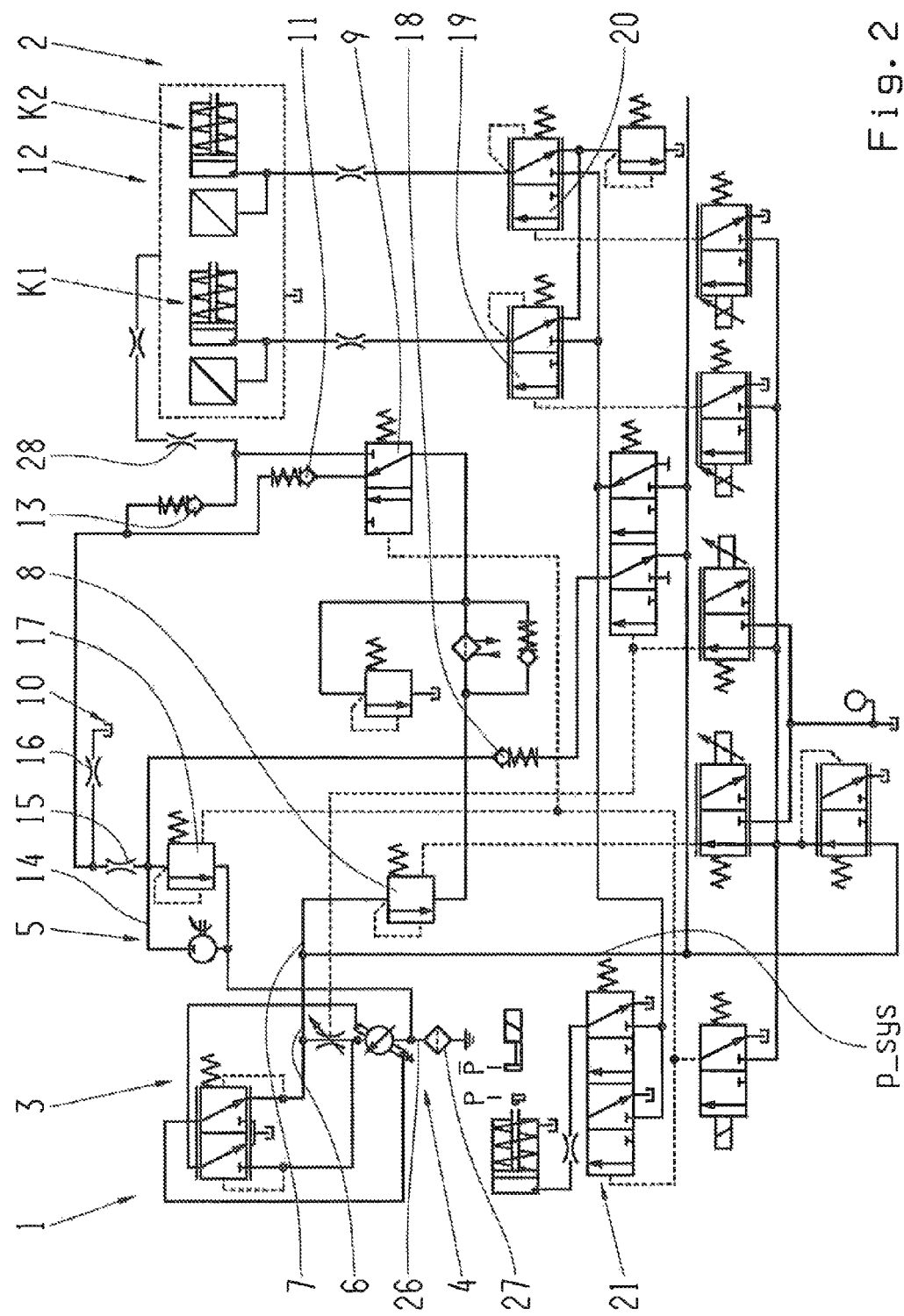
FIG. 2 a view of a hydraulic system, corresponding to FIG. 1, of a second embodiment of the transmission device in accordance with the invention.

In contrast to this, with the embodiment of the transmission device 2 shown in FIG. 2, which essentially corresponds to the design of the transmission device 2 in accordance with FIG. 2, the two pump units 4 and 5 feature a common suction line 26 with a common filter device 27. At sufficiently high driving speeds, the suction charging of the second pump unit 5 is used for the common suction line 26, by which an energy discharge of the two pump units 4 and 5 is possible.

Modifications and variations can be made to the embodiments illustrated or described herein without departing from the scope and spirit of the invention as set forth in the appended claims.

The invention claimed is:

1. A transmission device for a vehicle, comprising:
   a hydraulic system that further comprises primary high pressure circuit and a first additional low pressure circuit supplied with hydraulic fluid by a pump device;
   the pump device further comprising a first pump unit connected to and driven by a transmission input shaft connected to a vehicle drive unit, and a second pump unit connected to and driven by a transmission output shaft;
   the first pump unit comprising a pressure side connected to the primary high pressure circuit and also connectable to the first additional pressure circuit;
   the second pump unit comprising a pressure side connected to the first additional low pressure circuit and also connectable to the primary high pressure circuit;
   wherein the first pump unit comprises an adjustable vane pump having an adjustable output volume, the first pump sized to primarily supply the high pressure circuit during normal operation wherein the drive unit is driving the transmission input shaft and the transmission output shaft is driving the second pump; and wherein the second pump unit comprises a fixed-displacement pump and is sized to provide only limited functionality to the high pressure circuit when the vehicle drive unit is switched off.

2. The transmission device as in claim 1, wherein the pressure side of the second pump unit is connectable to the primary pressure circuit through a first non-return valve upon a positive pressure gradient between the first additional pressure circuit and the primary pressure circuit.

3. The transmission device as in claim 2, wherein the pressure side of the first pump unit is connectable to the first additional pressure circuit through a valve unit between the primary pressure circuit and the first additional pressure circuit.

4. The transmission device as in claim 3, further comprising a second additional pressure circuit in addition to the first additional pressure circuit, wherein the pressure side of the first pump unit is connectable to the second additional pressure circuit through the valve unit while at the same time connectable to the first additional pressure circuit through a second non-return valve upon a positive pressure gradient between the primary pressure circuit and the first additional pressure circuit.

5. The transmission device as in claim 4, wherein the second non-return valve is provided in a line upstream of a throttle device to the second additional pressure circuit.

6. The transmission device as in claim 4, further comprising a throttle device in a line between the second return valve and the pressure side of the second pump unit.

7. The transmission device as in claim 6, wherein the first additional pressure circuit is connected to the pressure side of the second pump unit by a line downstream of the throttle device.

8. The transmission device as in claim 1, wherein the pressure side of the second pump unit comprises a pilot-controlled pressure limiting valve to vary pressure in the pressure side of the second pump unit.

9. The transmission device as in claim 1, wherein the first pump unit and the second pump unit have a common suction line.

10. The transmission device as in claim 1, wherein the first pump unit and the second pump unit have separate suction lines and separate sumps.

* * * * *